United States Patent [19]

Krebs et al.

[11] Patent Number: 5,289,706
[45] Date of Patent: Mar. 1, 1994

[54] BEZEL RETAINED PUSH BUTTON ASSEMBLY

[75] Inventors: Ronald R. Krebs, Fond du Lac; Kevin J. Elinski, Milwaukee, both of Wis.

[73] Assignee: Briggs & Stratton Corporation, Wauwatosa, Wis.

[21] Appl. No.: 58,681

[22] Filed: May 4, 1993

Related U.S. Application Data

[63] Continuation of Ser. No. 736,010, Jul. 25, 1991, abandoned.

[51] Int. Cl.⁵ .............................................. B60R 25/04
[52] U.S. Cl. ........................................ 70/252; 70/237; 70/441
[58] Field of Search ............... 70/252, 389, 441, 237, 70/182–186

[56] References Cited

U.S. PATENT DOCUMENTS

| | | | |
|---|---|---|---|
| 1,795,547 | 3/1931 | Fairchild | 70/252 |
| 1,830,265 | 11/1931 | Fairchild | 70/252 |
| 1,945,527 | 2/1934 | Gilpin | 70/252 |
| 3,633,394 | 1/1972 | Pieck et al. | 70/389 |
| 3,638,462 | 2/1972 | White et al. | 70/252 X |
| 3,648,490 | 3/1972 | Kimberlin et al. | 70/186 |
| 3,673,829 | 7/1972 | Mizuno | 70/252 |
| 3,702,550 | 11/1972 | Shimizu | 70/252 |
| 3,789,636 | 2/1974 | Nakashima | 70/252 |
| 3,828,594 | 8/1974 | Yamamoto | 70/252 |
| 4,029,168 | 6/1977 | Kramer | 180/114 |
| 4,332,306 | 6/1982 | Turatti | 180/287 |
| 4,487,042 | 12/1984 | Mochida et al. | 70/186 |
| 4,905,487 | 3/1990 | Morikawa et al. | 70/186 |
| 4,938,043 | 7/1990 | Burr | 70/252 |
| 5,036,687 | 8/1991 | Takeuchi et al. | 70/252 X |

FOREIGN PATENT DOCUMENTS

| | | | |
|---|---|---|---|
| 1159292 | 12/1963 | Fed. Rep. of Germany | 70/252 |
| 1161489 | 1/1964 | Fed. Rep. of Germany | 70/185 |
| 1166642 | 3/1964 | Fed. Rep. of Germany | 70/186 |
| 1926723 | 11/1970 | Fed. Rep. of Germany | 70/252 |
| 3638429 | 5/1988 | Fed. Rep. of Germany | 70/252 |
| 2457792 | 1/1981 | France | 70/237 |
| 0037047 | 3/1982 | Japan | 70/237 |
| 0070249 | 3/1989 | Japan | 70/252 |

Primary Examiner—Lloyd A. Gall
Attorney, Agent, or Firm—Andrus, Sceales, Starke & Sawall

[57] ABSTRACT

A device for preventing the undesired rotation of a key and cylinder within a sleeve of an automobile steering column ignition assembly. The device prevents rotation of a key from an off position to a lock position, and the consequent locking of the steering wheel, unless an adjacent button is depressed. Rotation is prevented by the interference of a blocking element on the button itself with an end face of a flange projecting from a cap covering the outer end of the cylinder.

10 Claims, 2 Drawing Sheets

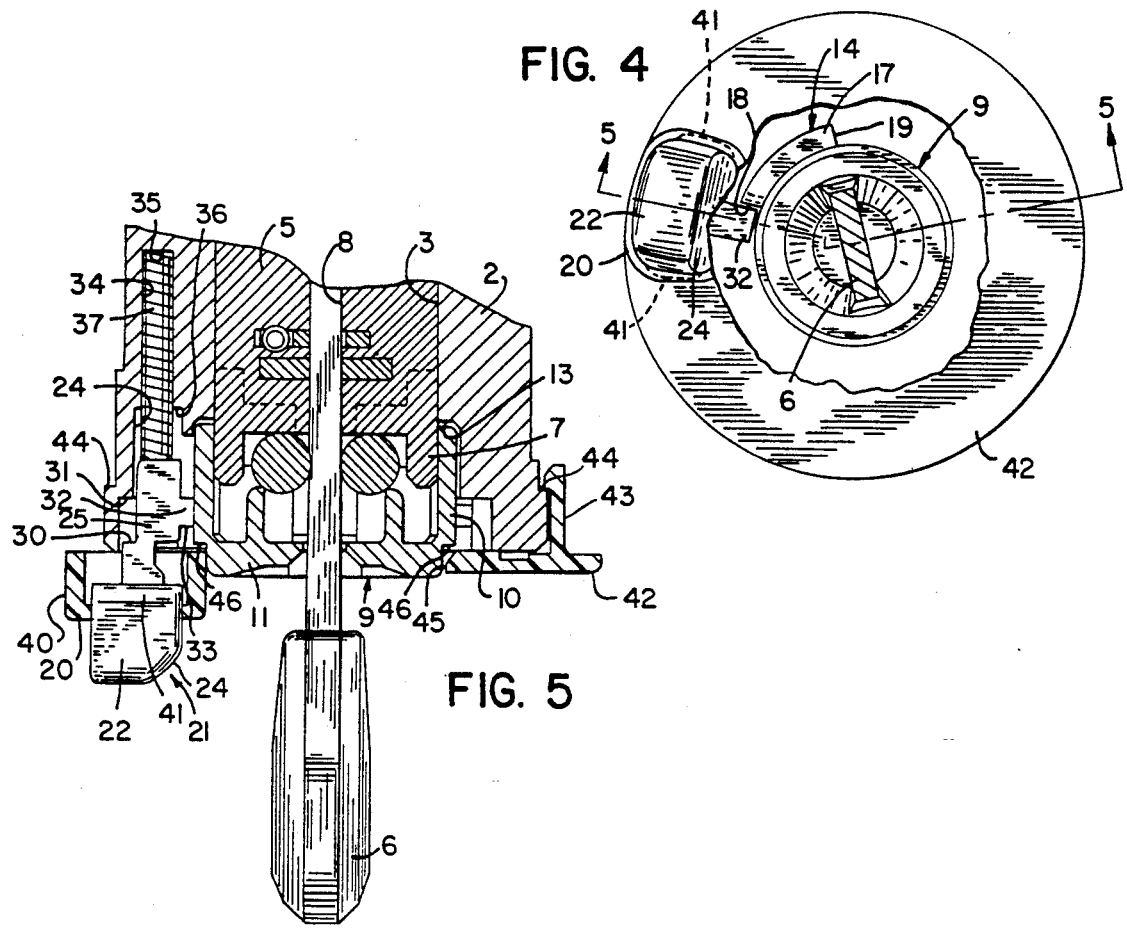
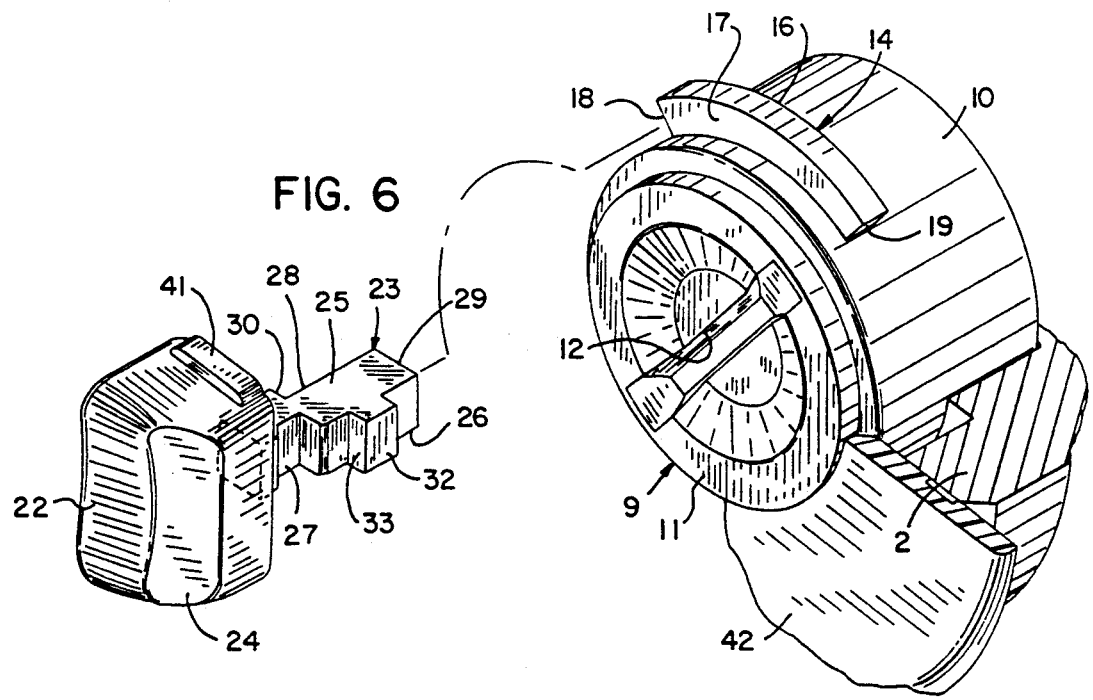

BEZEL RETAINED PUSH BUTTON ASSEMBLY

This application is a continuation of application Ser. No. 07/736,010, filed Jul. 25, 1991, now abandoned.

BACKGROUND OF THE INVENTION

The present invention relates to a safety device for anti-theft mechanisms for motor vehicles.

The prior art shows motor vehicle anti-theft devices intended to lock the steering mechanism of a vehicle when the ignition key is removed or turned to a non-operating position. This type of locking is desirable when the vehicle is at rest. Such anti-theft devices are typically disengaged by inserting a key with the correct "coding" into the ignition lock assembly and rotating the assembly to its start or run position. However, a potential problem with this type of steering lock device is that if a key in a cylinder were to be inadvertently rotated to a non-operating position while the vehicle was in motion the steering mechanism could lock up, thereby preventing a vehicle directional change and resulting in a potential accident. The key could be inadvertently rotated for any number of reasons by an operator or passenger. As a result, the locking of the steering mechanism when a vehicle is in motion should be prevented.

In order to prevent an inadvertent or undesired lock-up of the steering mechanism, devices are known that prevent key removal when the ignition is switched off until a motor vehicle operator performs a specific and independent supplemental operation to rotate the key from its off position to a steering mechanism locked position. Examples of such devices are shown in U.S. Pat. Nos. 3,633,394, 3,789,636 and 4,938,043 wherein an ignition key may be rotated to a lock position from its off position only upon depressing a button adjacent the key.

SUMMARY OF THE INVENTION

The present invention provides a device that prevents both withdrawal of the key and rotation of the key to a lock position after the ignition is switched off until the operator performs an auxiliary operation which requires, in addition to grasping the key, the depression of a button adjacent to the key.

The vehicle operator may freely rotate the key from the engine "start" or "run" positions to the "off" position, such that the engine discontinues operation. The rotation of the key from either the engine start or run positions to the off position is a counterclockwise motion. In any of the engine start, run or off key positions, the push button is in its out or popped up position. However, the operator may not rotate the key counterclockwise any further from the off position until the push button is depressed. Depressing the button will allow further counterclockwise rotation to the "lock" position from which the key may be removed, or even further to an "accessories" position. In the locked position, the steering mechanism becomes locked and the steering wheel is thus prevented from being turned.

Likewise, when the key is inserted into the ignition assembly it may be rotated counterclockwise from the "lock" position to the "accessories" position, or it may be rotated clockwise from the "lock" position to the "off", "run" or "start" positions, if desired, without depressing the push button. The key and cylinder may be freely rotated counterclockwise back from the "run" or "start" positions to the "off" position without depressing the push button. However, it may not be rotated back in the counterclockwise direction to the "lock" position from the "off" position until the push button is depressed.

A feature and advantage of the invention is that it stops the rotation of the key and cylinder in the counterclockwise direction past the ignition "off" position. This stopping of counterclockwise rotation prevents accidental locking of the steering wheel and removal of the key when the vehicle is in motion. Instead, the operator must perform an independent specific hand-thumb movement to rotate the key to the "lock" position in order to disable the steering wheel.

BRIEF DESCRIPTION OF THE DRAWINGS

The drawings illustrate the best mode presently contemplated of carrying out the invention. In the drawings:

FIG. 4 is a cross-sectional view of the ignition lock assembly similar to FIG. 2 with the key and cylinder in their off position;

FIG. 5 is a fragmentary cross-sectional view taken along line 5—5 in FIG. 4 of the ignition lock assembly; and FIG. 6 is an exploded perspective view of the push button and cap of the ignition assembly.

DETAILED DESCRIPTION OF THE INVENTION

Figure 1:
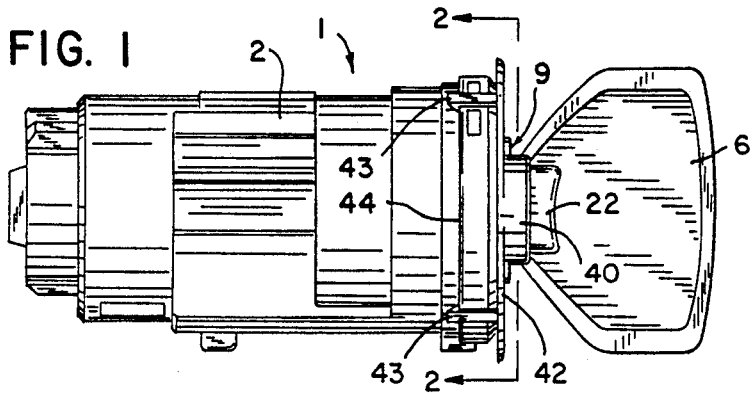
FIG. 1 is a side view of an automobile steering column ignition lock assembly having a push button assembly in accordance with the present invention.

Referring now to the drawings, FIGS. 1-6 illustrate an automobile steering column ignition lock assembly having a push button assembly constructed in accordance with the present invention for preventing undesired rotation and/or removal of a key in an automobile ignition switch assembly. Although illustrated as being employed with an automobile steering column ignition lock assembly, the push button assembly of the present invention may have other lock applications where it is desired to prevent key removal prior to an operator performing an auxiliary independent hand-thumb operation or movement to rotate the key to a "lock" or "key-out" position.

Figure 2:
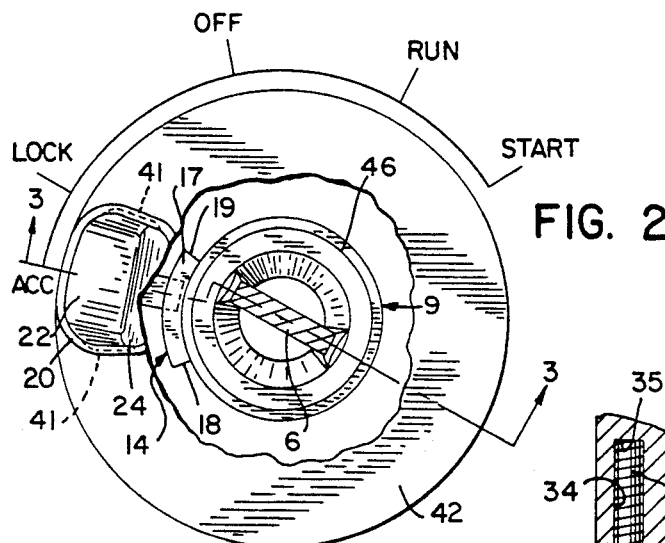
FIG. 2 is a cross-sectional view with parts broken away of the ignition lock assembly taken along line 2—2 in FIG. 1 with a key and cylinder rotated to their lock position.

The lock assembly is generally designated by the numeral 1, and includes a stationary elongated hollow sleeve member 2 mounted within a steering column (not shown) of an automobile. As shown best in FIG. 3, sleeve 2 has a bore 3 formed therein defining an axis of rotation 4. Bore 3 is dimensioned to receive a barrel or cylinder 5 therein for rotation clockwise or counterclockwise about axis 4 to a plurality of desired positions. As shown in FIG. 2, these positions include: an "accessories" position wherein a vehicle ignition system is disabled but its electrical system is operable; a "lock" position wherein a vehicle ignition system and electrical system are disabled and the key can be removed, but the steering wheel cannot be turned; an "off" position wherein a vehicle's ignition and electrical systems are disabled and the key cannot be removed; a "run" position wherein a vehicle's ignition and electrical systems are operable under normal driving conditions; and a "start" position wherein a vehicle's ignition system is fired to start the engine.

Cylinder 5 houses the tumblers and other mechanisms (not shown) that must be adjusted to a particular position by key 6 before cylinder 5 may be rotated, as is conventional. Cylinder 5 has an inner end (not shown) disposed in bore 3 and an outer end 7 projecting from bore 3. As shown best in FIG. 5, cylinder 5 also includes an elongate key-receiving aperture 8 disposed coaxially with axis 4.

A cap 9 is mounted on the outer end 7 of cylinder 5 for rotation therewith. Cap 9 is substantially U-shaped in cross-section (see FIGS. 3 and 5), and includes a cylindrical skirt 10 surrounding the outer end 7 of cylinder 5 which is integral with a substantially flat circular face plate 11 covering outer end 7. Face plate 11 includes a key-receiving slot 12 formed therethrough and disposed in axial alignment with aperture 8 forming a keyway therewith for receiving and guiding key 6. Bore 3 includes an annular shoulder 13 (FIGS. 3 and 5) that forms a cylindrically shaped recess at the outer end of bore 3 for accommodating and receiving cap member 9.

Referring now to FIGS. 2, 4 and 6, cap 9 includes a flange 14 projecting radially from skirt 10 and extending partially around the circumference thereof. Flange 14 defines an inner face 16, an opposite outer face 17, and a pair of opposite end faces 18, 19. End faces 18, 19 are both flat, and as shown best in FIG. 6, faces 18, 19 project radially from skirt 10 to have the same height as the height of flange 14, and their thicknesses are the same as the thickness of flange 14. In particular end face 18 forms a stop or abutment for interfering with a blocking element 32 on button 21, hereinafter to be described.

Push button assembly 21 comprises a head 22 attached to an integral elongated shank member 23. Head 22 projects from the outer end of sleeve 2 adjacent cap 9 and key 6. Head 22 is generally rectangular in shape having a pair of oppositely disposed tabs or ridges 41 (only one of which is shown in FIG. 6) projecting from its periphery which is utilized to retain push button 21 within a hollow tubular retainer 40 (FIG. 5). A lip 20 formed along the entire interior surface of retainer 40 interferes with tabs 41 to retain push button 21 in its out or popped up position when cylinder 5 is rotated between its "off", "run" and "start" positions. Head 22 also has an angled sloping face 24 (FIG. 3) on its outermost surface adjacent key 6 which provides adequate clearance for the head of key 6 when rotated in a counterclockwise direction. Retainer 40 is an integral part of an annular shaped bezel 42 which covers the front of sleeve 2. Bezel 42 is secured on sleeve 2 by a plurality of circumferentially spaced integral hook members 43 which engage a circular ledge 44 formed in sleeve 2. Bezel 42 has a central opening 45 formed therein through which plate 11 of cap 9 projects. Bezel 42 thus aids in securing cap 9 in place due to the overlap of inner edge along opening 45 with a shoulder 46 formed in cap 9 at the intersection of skirt 10 and plate 11.

Shank member 23 projects from head 22 and is positioned within a passageway 24 formed in sleeve 2 for axial sliding movement therein between a blocking position which prevents rotation of cylinder 5 and key 6 and a non-blocking position which allows free rotation of cylinder 5 and key 6. Shank member 23 includes an upper flat face 25, an opposite lower flat face 26, a stepped inner face 27, a stepped outer face 28, and a flat end face 29. Outer face 28 includes a stop 30 formed therein which cooperates with a shoulder 31 formed in the outer end of passageway 24 (see FIGS. 3 and 5) for limiting the axial sliding movement of push button 21. Inner face 27 includes a blocking element 32 projecting radially inwardly therefrom. Blocking element 32 engages end face 18 of flange 14 when push button 21 is out or popped up in its blocking position, and key 6 is attempted to be rotated counterclockwise from its "off" position to its "lock" position. The radial dimension of blocking element 32 is substantially equal to the height of flange 14 while the axial thickness of blocking element 32 is substantially equal to the axial thickness of flange 14. Blocking element 32 also defines a flat sliding surface 33 extending between faces 25 and 26 for sliding engagement with inner face 16 of flange 14 when push button 21 is depressed in its non-blocking position.

A blind bore 34 is also formed in sleeve 2, and is defined by end wall 35 and shoulder 36. Bore 34 has a diameter less than passageway 24, and is coaxial therewith. A coil spring 37 is disposed within bore 34 such that one end bears against end wall 35 and the other end bears against end face 29 of shank 23 of push button 21. Spring 37 thus biases push button 21 axially outwardly from sleeve 2 away from end wall 35 i.e. downwardly in FIGS. 3 and 5.

In operation, key 6 is inserted into cylinder 5 by a motor vehicle operator until it stops. Before key rotation, cylinder 5 is in its "lock" position and push button 21 is located in its depressed position (FIGS. 2 and 3) which allows for free rotation of the ignition assembly in either direction. From this position, counterclockwise rotation would move key 6 and cylinder 5 to an "accessory" position while clockwise rotation would move key 6 and cylinder 5 first to the "off" position, and then to the "run" position and finally to the "start" position, as is conventional.

Figure 3:
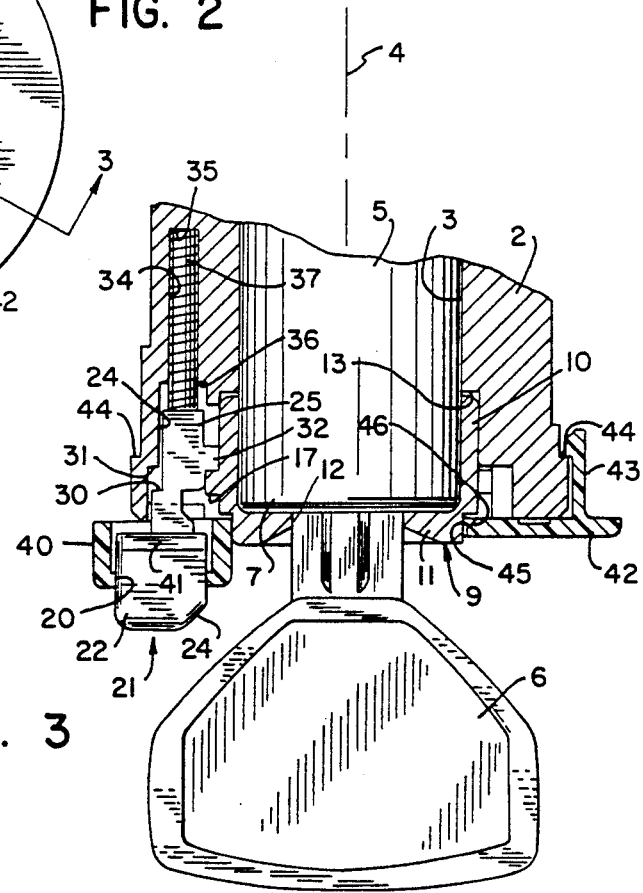
FIG. 3 is a fragmentary cross-sectional view taken along line 3—3 in FIG. 2 of the ignition lock assembly.

In this initial position, i.e. the "lock" position, sliding surface 33 is adjacent to and is in sliding contact with inner face 16 of flange 14 and spring 37 is in its compressed position (FIG. 3). Push button 21 is in a depressed condition with an outward bias originating from spring 37 urging surface 33 against inner face 16 of flange 14.

Key 6 will rotate from its initial "lock" position in either direction with a slight rotational frictional force between face 16 and surface 33. Also, cylinder 5 and cap 9 will freely rotate within sleeve 2 with key 6 from the "lock" position. If key 6 is rotated counterclockwise to the "accessories" position, button 21 remains depressed with surface 33 in sliding contact with inner face 16.

As key 6 is rotated from its initial "lock" position in a clockwise direction, cylinder 5 and cap 9 will also rotate in the same direction. After approximately 47° of rotation and just prior to reaching the "off" position face 33 of blocking element 32 (FIG. 6) will clear end face 18 of flange 14. As a result, surface 33 will no longer be behind flange 14. This will allow blocking element 32, along with push button 21, to "pop-out", i.e. be urged by spring 37 outwardly until element 32 is adjacent face 18 of flange 14 (FIG. 4). Push button 21 is now biased to its outermost position i.e. its blocking position just prior to key 6 being in the "off" position. In this position, face 18 interferes with blocking element 32 so that face 18 will abut against blocking element 32 to prevent free counterclockwise rotation from the "off" position. Push button 21 is held in its popped out position by the engagement of tabs 41 with lip 20 of retainer 40.

Key 6 may thereafter be rotated further clockwise from the "off" position to the "run" and "start" positions and then counterclockwise back to the "off" position without depressing push button 21. However, in the "off" position, push button 21 will prevent counterclockwise rotation because face 18 abuts against blocking element 32 preventing such rotation. To rotate counterclockwise from the "off" position to either the "lock" or "accessories" positions, an operator must first depress button 21 thereby moving blocking element 32 inwardly and compressing spring 37 until sliding surface 33 of blocking element 32 clears inner face 16 of flange 14 and thereafter at the same time rotate key 6 counterclockwise.

Various modes of carrying out the invention are contemplated as being within the scope of the following claims, particularly pointing out and distinctly claiming the subject matter which is regarded as the invention.

We claim:

1. A lock assembly for a vehicle ignition switch, comprising:
   a stationary elongated hollow sleeve member having a bore therein defining an axis of rotation;
   a cylinder having an inner end disposed in said bore and an opposite outer end, said cylinder rotatable about said axis between at least lock, off and run positions, and including a key-receiving aperture formed therein opening to said outer end;
   a cap member mounted on the outer end of said cylinder for rotation therewith, said cap member including a key-receiving slot formed therein in axial alignment with said aperture forming a keyway therewith;
   a push buttom mounted on said sleeve member and slidably movable in an axial direction between a blocking position and a non-blocking position;
   spring means on said sleeve member for biasing said push button into said blocking position; and
   stop means on said cap member projecting radially therefrom, said stop means abuts against said push button when said cylinder is in said off position to permit movement to said run position but to prevent movement to said lock position so that said push button must be moved to its non-blocking position to permit movement to said lock position from said off position.

2. The lock assembly of claim 1 wherein said sleeve member includes a passageway formed therein at a location eccentric to said bore, and said spring means and push button are contained in said passageway.

3. The lock assembly of claim 1 wherein said stop means includes a flange means projecting radially therefrom having an end face that is engageable with said push button.

4. The lock assembly of claim 3 wherein said end face is formed by an edge of said flange means.

5. The lock assembly of claim 4 wherein said push button includes a blocking element engageable with said end face when said cylinder is in said off position.

6. The lock assembly of claim 1, further including a bezel mounted on said sleeve member, said bezel including a tubular member for receiving and guiding said push button during movement between its blocking and non-blocking positions.

7. The lock assembly of claim 6 wherein said bezel further includes retaining means for retaining said push button in said tubular member.

8. The lock assembly of claim 7 wherein said retaining means comprises a tab on said push button and a lip on said tubular member.

9. A lock assembly for a vehicle ignition switch, comprising:
   a stationary elongated hollow sleeve member having a bore therein defining an axis of rotation;
   a cylinder having an inner end disposed in said bore and an opposite outer end, said cylinder rotatable about said axis between at least lock, off and run positions, and including a key-receiving aperture formed therein opening to said outer end;
   a cap member mounted on the outer end of said cylinder for rotation therewith, said cap member including a key-receiving slot formed therein in axial alignment with said aperture forming a keyway therewith;
   a push button mounted on said sleeve member and slidably movable in an axial direction between a blocking position and a non-blocking position;
   spring means on said sleeve member for biasing said push button into said blocking position;
   stop means on said cap member projecting radially therefrom, said stop means abuts against said push button when said cylinder is in said off position to permit movement to said run position but to prevent movement to said lock position so that said push button must be moved to its non-blocking position to permit movement to said lock position from said off position;
   a bezel mounted on said sleeve member, said bezel including guide means for receiving and guiding said push button during movement between its blocking and non-blocking positions; and
   retaining means on said bezel for retaining said push button when said cylinder is in its off and run positions.

10. The lock assembly of claim 9 wherein said retaining means comprises a tab on said push button that interfers with a lip on said bezel.

* * * * *

UNITED STATES PATENT AND TRADEMARK OFFICE
CERTIFICATE OF CORRECTION

PATENT NO. : 5,289,706
DATED : March 1, 1994
INVENTOR(S) : Ronald R. Krebs et al It is certified that error appears in the above-indentified patent and that said Letters Patent is hereby corrected as shown below:

IN THE CLAIMS:

Claim 1, column 5, line 37: Delete "buttom" and substitute therefore ---button---

Signed and Sealed this

Twenty-seventh Day of September, 1994

Attest:

BRUCE LEHMAN

Attesting Officer          Commissioner of Patents and Trademarks